April 21, 1959  R. B. JACOBS  2,883,542
SYSTEM FOR QUANTITATIVE HYDROGEN DETERMINATIONS
Filed Sept. 22, 1954  2 Sheets-Sheet 1

INVENTOR.
Robert B. Jacobs
BY
Everett A. Johnson
ATTORNEY

United States Patent Office 2,883,542
Patented Apr. 21, 1959

2,883,542

SYSTEM FOR QUANTITATIVE HYDROGEN DETERMINATIONS

Robert B. Jacobs, Homewood, Ill., assignor to Standard Oil Company, Chicago, Ill., a corporation of Indiana Application September 22, 1954, Serial No. 457,652

16 Claims. (Cl. 250—43.5)

This invention relates to a method and apparatus for determining hydrogen without destructive chemical analysis. It pertains more specifically to a method for determining the weight percentages of hydrogen in solids, liquids, or gases.

It is frequently desirable to know accurately the percentage of hydrogen in compounds or mixtures which heretofore could be determined only by the time-consuming operations and chemical analysis. For example, it is well known that the carbon-hydrogen ratio is a basic and important property of hydrocarbons. There is a close connection between the carbon-hydrogen ratio of a petroleum product and its commercial value. Thus the degree of hydrogen saturation of the different components of gasoline affect their knocking properties and the burning quality of a heater oil is directly related to its carbon-hydrogen ratio. The measurement of the carbon-hydrogen ratio is so difficult, however, that it is seldom used in commercial practice.

Therefore it is a primary object of the invention to provide a method and apparatus which will give an accurate quantitative determination of the hydrogen content of a substance without the necessity of any physical separation or chemical reaction. A further object of my invention is to provide a method for determining carbon-hydrogen ratios of hydrocarbons by physical means. An additional object is to provide a system adaptable for routine control determination of hydrogen in homogeneous substances. These and other objects of the invention will become apparent as the description of the invention proceeds.

Briefly, the invention comprises placing the sample of known specific gravity containing an unknown proportion of hydrogen between a radiation source and a radiation device and measuring the unabsorbed radiation. Since hard gamma rays or energetic beta rays are absorbed approximately equally by all elements excepting hydrogen for which the absorption is approximately twice as great on a weight basis, the extent of this absorption provides, under the proper conditions and circumstances, a quantitative measure of the hydrogen content of the sample.

All penetrating radiation is to a certain extent scattered or absorbed by the material through which it passes and the amount of radiation scattered and absorbed from any unit volume will depend upon the number of electrons in this unit volume. Further, the number of electrons per unit volume is related to the density of the material and to its hydrogen content and the amount of absorption per unit volume will depend upon the density of the material and its hydrogen content. Thus, it is found that as the density of a material or its hydrogen content increases, the percentage of radiation scattered or absorbed will likewise increase. Accordingly, my method of quantitative determination of hydrogen requires that the absorption or extent of penetration be correlated with the specific gravity of the sample which can be determined by conventional hydrometer and other methods.

In accordance with the present invention, a source of penetrative radiation is placed on one side of a sample cell and a radiation detector is placed on the opposite side of the cell. The amount of radiation passing from the source to the detector will be a function of the radiation absorption properties of the sample. A meter connected to the detector provides a reading which is a function of the quantitative hydrogen content of the sample and may be calibrated in percent hydrogen.

A specific gravity determination is essential to the computation of percent hydrogen and, by obtaining the specific gravity of the sample in the cell during the radiation absorption measurement, the necessity for controlling the temperature of the cell or for even measuring the temperature of the cell is completely avoided. Thus, by my invention any error attributable to any difference between the temperature at which the specific gravity is taken and the specific temperature of the sample in the cell is eliminated and makes possible a substantial simplification of the total apparatus required and of the handling procedures. This latter point is particularly important where only small quantities of samples are available or where the sample is noxious or difficult to handle.

Another advantage of the simultaneous specific gravity and gamma absorption determinations is that viscous samples can be handled conveniently by suitable heating of the apparatus. On the other hand, for volatile liquids evaporation losses can be minimized by operating at a temperature substantially below normal room temperature. Evaporation loss is a source of error, particularly when the sample contains fractions boiling at different temperatures. Hence, upon exposure the sample is no longer of the same specific gravity and composition. Accordingly, if evaporation occurs between the times of determining specific gravity and of measuring the gamma absorption erroneous results for the percent hydrogen would be obtained. By my invention, however, there is no possibility for evaporation from the sample between the specific gravity determination and the gamma ray absorption determination.

The quantity of radiation received with the sample cell empty is designated as $I_0$ and the quantity of radiation received with the sample in place is designated as $I$. A plot is made of $\log I / \log I_0$ against specific gravity of the sample material. Substances having equal weight percentages of hydrogen are found to lie along approximately straight lines and substances of increasing hydrogen content are found to lie along other approximately parallel lines displaced in the direction of the origin of the plot.

The gamma ray system according to this invention permits analysis for percent hydrogen without any knowledge whatsoever of even one of the constituents of a multi-component sample. Furthermore, the presence of such elements as phosphorus and sulfur in the sample does not require any correction of the percent hydrogen value. Heretofore, the prior art has led those skilled in the art to believe that in any nuclear radiation measurement it is necessary to have at least a qualitative knowledge of the constituents present in a sample whether it be a binary component or a multi-component system. I have found that by my technique of specific gravity measurement and radiation determinations, the gamma ray absorption is unique and specific to hydrogen.

Further details of the invention will be described in connection with the attached drawings which form a part hereof and wherein.

Figure 1:
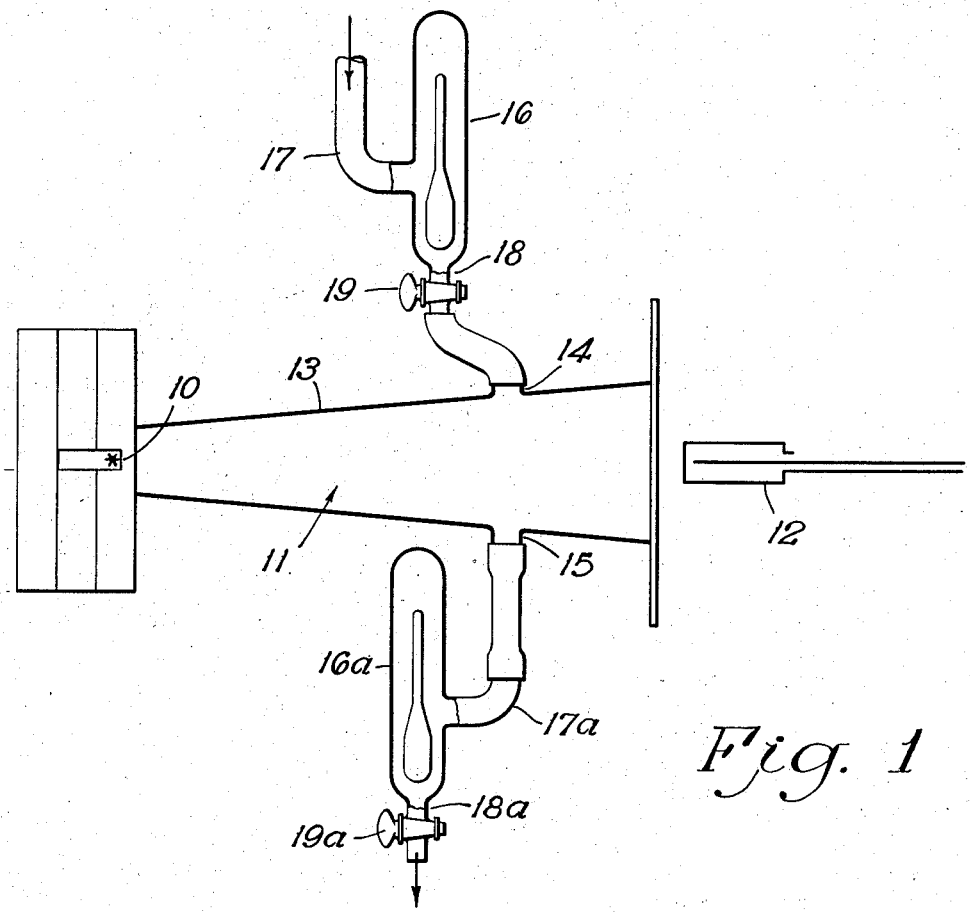
Figure 1 is a schematic diagram of the elements of one form of apparatus.

The experimental procedure comprises measuring the specific gravity of the sample immediately before placing it in the sample cell and immediately after withdrawing it therefrom or the two measurements may be made simultaneously. In this way the specific gravity measurement and the absorption measurement are made at the same temperature. If desired, however, we may provide a constant temperature bath within which the specific gravity and absorptivity measurements are made. Three five-minute counting runs are made for each sample and the mean counting rate, i.e. the number of counts per 100 seconds for the system with the cell filled with the liquid sample determined.

In general, the counting efficiency of the radiation detector is constant when operated at the same temperature. However, to compensate for possible slow drifts, a standard material of known specific gravity and known hydrogen content can be run from time to time as a standard and calibrating sample. It is also contemplated that a pair of identical cells and counter means may be associated with a single hard radiation source with the outputs of the counter connected to a differential electrical circuit so as to give a differential reading with reference to the standard. One such arrangement is shown in Figure 2 of the drawing.

Referring to the drawings, the source 10 of hard radiation may comprise 20 millicuries of $Co^{60}$. The sample cell 11 may be 14.5 to 16 inches long and the counting device 12 may comprise a Nuclear Instrument Corporation Model D31 Geiger counter. The cell is surrounded by a shield 13 and also may be encased in heat insulation material. A fill inlet 14 and a drain outlet 15 are provided in the cell 11. To the inlet 14 may be connected a specific gravity determination means such as hydrometer 16 having an inlet 17, an outlet 18 and a valve 19 in the outlet 18. This arrangement can be used to determine the specific gravity immediately preceding the introduction of the sample to the cell. The same or similar specific gravity determination means can then be applied to the drain outlet 15, as illustrated, for a repeat determination of the specific gravity following the absorption test in the cell 11.

The apparatus of Figure 1 permits handling of the sample for the specific gravity determination and the gamma absorption determination without exposure of the sample. Thus, the valve 19a at the base of the hydrometer 16a is closed and the sample introduced into the cell 11 by way of inlet 17. If it is desired to make a specific gravity determination before introducing the sample into the cell, the valve 19 may be closed and the determination made in hydrometer 16. In any event, as the sample is introduced into cell 11 a portion of the sample flows into the hydrometer 16a and with valve 19a closed a specific gravity determination can be made simultaneously with the gamma ray absorption determination within cell 11.

Figure 2:
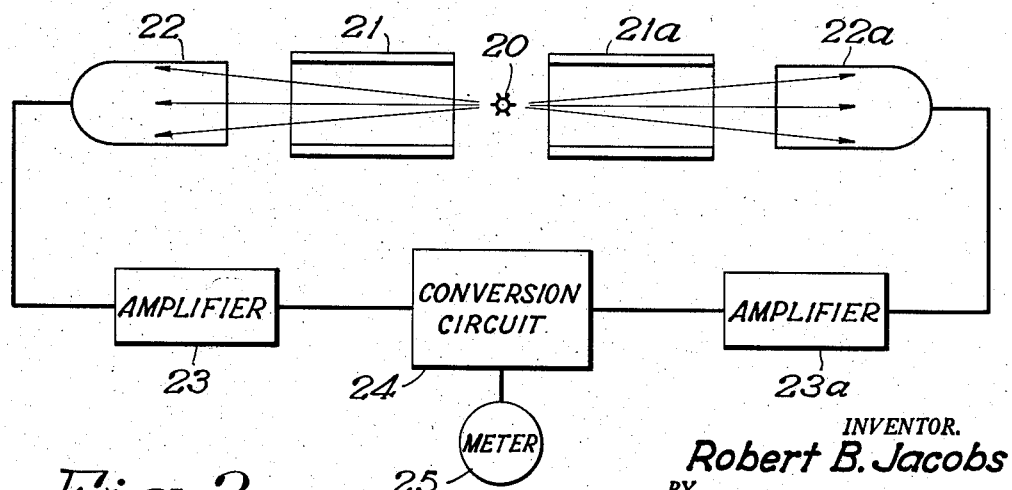
Figure 2 illustrates another form of apparatus.

Figure 2 is a schematic showing of a comparative test apparatus. A single source 20 transmits a beam of gamma or beta rays through sample cell 21 and standard cell 21a. If desired the cells 21 and 21a need not be in opposed position but instead means may be provided for intermittently and cyclically directing the beam from the source 20 through the standard cell 21 and then the sample cell 21a. Each of cells 21 and 21a is shown as associated with a detector 22 and a second detector 22a. The output or signal from these detectors is separately amplified by amplifiers 23 and 23a and fed to conversion circuit 24 to give a difference or a ratio reading indicated by meter 25. Other configurations of the components can be made without departing from the invention.

The metering means 25 is adapted to give a differential value corresponding to the log of the ratio of the radiation received by detector 22 and the quantity of radiation received by the detector 22a. If desired, the ratio reading can be indicated on a scale calibrated in terms of hydrogen content, separate scales being used for materials of different specific gravity. For this purpose we may provide a scale based upon the information illustrated in Figures 3 or 4.

For the experimental determination of the percentage hydrogen the following nomenclature is employed:

$I$ number of rays detected per 100 seconds with the absorption cell filled.

$I_0$ number of rays detected per 100 seconds with the absorption cell empty.

$\rho$ measured specific gravity of the sample at the temperature of the experiment.

$\rho_H$ specific gravity of the hydrogen contained in the sample at the temperature of the experiment, i.e. the unknown of the experiment.

The experimental procedure is as follows:

Step 1: Measure $I_0$.
Step 2: Measure $\rho$ for the sample.
Step 3: Measure $I$ for the sample.
Step 4: Remeasure $\rho$.
Step 5: Plot log $I/I_0$ against $\rho$ as indicated in Figure 3.

Figure 3:
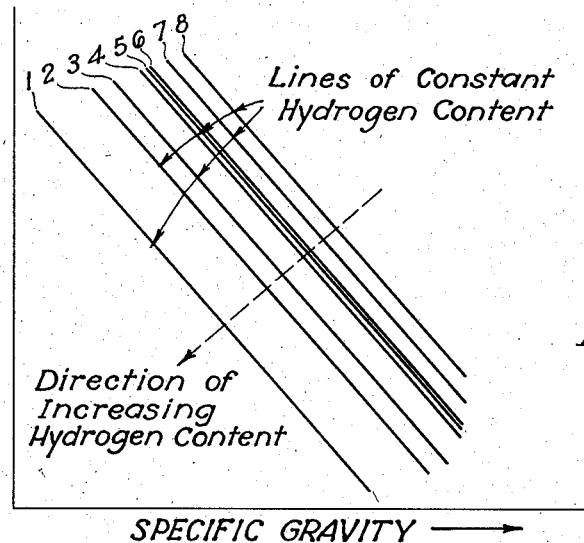

In Figure 3 I have plotted $\rho$ against log $I/I_0$ measured as outlined above for a series of liquids of known composition using 5 millicuries of radium as the source 10, a sample cell 11 of about twelve inches in length, and a Geiger Nuclear tube as a detector 12. The plotted data are also set out in Table I below.

TABLE I

| Sample | Hydrogen Percentage | |
|---|---|---|
| | Theoretical | Measured |
| (1) Benzene | 7.7 | 7.7 |
| (2) Toluene | 8.7 | 8.6 |
| (3) Ethylene | 9.4₅ | 9.5₄ |
| (4) Isopropylbenzene | 10.0 | 9.7₆ |
| (5) Butylbenzene | 10.4₄ | 9.9 |
| (6) Triethylbenzene | 11.1 | 11.2 |
| (7) Decalin | 13.0₅ | 12.3 |
| (8) n-Hexadecane | 15.0₅ | 14.8 |

As shown in Figure 3, I have found that materials containing different percentages of hydrogen by weight lie on separate curves which are approximately straight and approximately parallel. Substances of increasing hydrogen content lie along lines displaced in the direction of the origin of the plot. Accordingly, to determine the percentage by weight of hydrogen in an unknown sample, one follows the above procedure (Steps 1 to 4) and then plots on Figure 3 the value of $I/I_0$ against the value of $\rho$ for the unknown and determines its weight percentage of hydrogen by interpolating between the curves previously obtained from the known samples.

Figure 4:
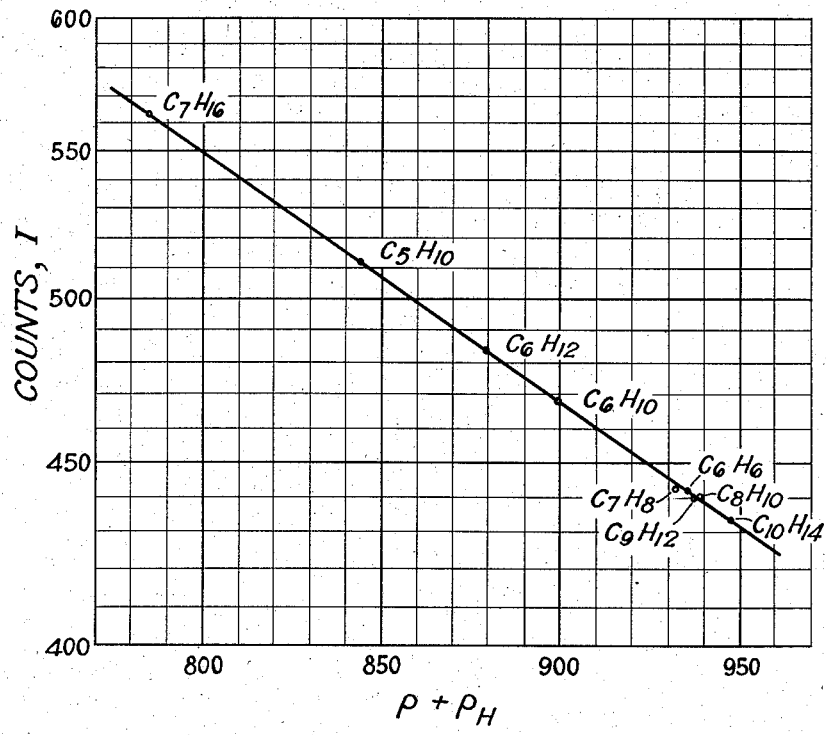
Figures 3 and 4 are curves utilized in translating observed values of radiation absorption into quantitative hydrogen values.

Alternatively, in place of Step 5 above, I may plot lot $I/I_0$ against $\rho+\rho_H$ as indicated in Figure 4. In Figure 4 experimental data from nine pure hydrocarbons of known composition (utilizing in this case the gamma rays from Cobalt 60) are plotted and a single calibration curve obtained. When using this method on an unknown sample, $I/I_0$ and $\rho$ are determined as indicated above and the value of $I/I_0$ is noted. From the curve in Figure 4, a unique value of $\rho+\rho_H$ is found graphically which corresponds to the measured value of $I/I_0$ for the unknown. Having measured $\rho$, $\rho_H$ may be determined by subtraction of $\rho+\rho_H$ and the percentage hydrogen by weight, i.e. $\rho_H/\rho \times 100$ may be calculated. Similarly, where the unknown is a hydrocarbon, the carbon-to-hydrogen ratio may be ascertained.

In Table II, my experimental results are summarized. Values of $(\rho+\rho_H)_{exp.}$ are obtained from the measured $I/I_0$ values graphically by means of Figure 4. These values are combined with experimentally determined specific gravity of sample $(\rho)$ to give the hydrogen percentages, i.e. $(\rho_H/\rho \times 100)$.

TABLE II

| Hydrocarbon | Mean Rate (Counts/100 sec.) from one 5 min. run | Specific Gravity (measured) $\rho$ | $(\rho+\rho_H)$ exp. | $(\rho_H/\rho \times 100)$ experimental | $(\rho_H/\rho \times 100)$ stoichiometric | Deviation $\times 100$ (exp.-stoich.) |
|---|---|---|---|---|---|---|
| Benzene | 442.5×128 | .8680 | .9348 | 7.70 | 7.75 | .05 |
| Toluene | 443.7×128 | .8570 | .9332 | 8.89 | 8.76 | .13 |
| Ethylbenzene | 440.2×128 | .8577 | .9382 | 9.39 | 9.50 | .11 |
| Isopropylbenzene | 439.9×128 | .8523 | .9385 | 10.11 | 10.07 | .04 |
| Butylbenzene | 434.2×128 | .8574 | .9470 | 10.45 | 10.52 | .07 |
| N-Heptane | 563.1×128 | .6757 | .7840 | 16.02 | 16.11 | .09 |
| Cyclohexene | 467.7×128 | .8012 | .9000 | 12.33 | 12.28 | .05 |
| Cyclohexane | 483.5×128 | .7690 | .8795 | 14.36 | 14.38 | .02 |
| Cyclopentane | 512.5×128 | .7374 | .8435 | 14.40 | 14.38 | .02 |
| Average Deviation, percent | | | | | | .064 |

In Figure 4, I have devised a plot of experimental values and measured properties of known samples. This plot is particularly useful in determining the carbon-to-hydrogen ratios of hydrocarbon liquids. More specifically, I have found for gamma rays that for hydrocarbons a plot of a value which is a function of the experimental values of I against a number equal to the sum of the specific gravity of the sample plus the specific gravity of the hydrogen content is a straight line. Accordingly, by determining the ratio of counts I for a sample and for a standard and applying this ratio to the plot of Figure 4, the values of $(\rho+\rho_H)$ are graphically obtained. These values are taken with the experimentally determined specific gravity $(\rho)$ of the sample to give the hydrogen percentages, i.e.

$(\rho_H/\rho \times 100)$ or the carbon-to-hydrogen ratios: $\dfrac{\rho-\rho_H}{\rho_H}$ Although I have described my process as including the determination of the specific gravity or density of the unknown sample, it is intended that equivalent functional specific gravity values may be used and that any value that is concomitant with specific gravity such as molecular weight may be correlated with the radiation absorption characteristic of the sample.

When gamma radiation is used and the unknown sample contains only carbon and hydrogen, a radiation energy of between about 0.050 m.e.v. to about 3.0 m.e.v. may be used. Where such carbon-hydrogen samples include, in addition, elements below iron in atomic number, a source 10 having a radiation energy of between about 0.30 m.e.v. to approximately 2.2 m.e.v. has been found to be very satisfactory. A narrower range of m.e.v. is suitable for determining hydrogen for the entire periodic table. Thus, if the sample is wholly unknown as to its composition the source 10 of a value of between about 1.1 m.e.v. to approximately 1.5 m.e.v. is desirable. With a beta ray source the useful range of radiation energy may be between about 0.5 m.e.v. and 5.0 m.e.v. with a source 10 of about 2.2 m.e.v. having been demonstrated as very satisfactory.

In Table II is given some hydrogen percentages measured according to my invention, and also is shown the theoretical stoichiometric percentages. From these data it will be noted that I can measure the percentage of hydrogen in a liquid to $\pm 0.07\%$ of the theoretical value. The principal source of error in my measurements is a statistical error introduced by the fact that the rate of decay of radioactive materials used as the hard radiation source 10 is a random process. This kind of error can be reduced somewhat by increasing the number of counts which, for practical reasons, can only be done by increasing the counting time. Up to a certain point a stronger source can be used effectively to reduce the error but beyond this the counter will count erratically if the counting rate is increased.

The accuracy obtained is roughly comparable to the best chemical methods and advantages of my method over chemical methods include the extreme simplicity as compared to any chemical analytical method. This simplicity has a two-fold advantage in that the physical measurement can be made in a matter of minutes rather than hours and that no professional skill is required. Another advantage is that the method is not appreciably affected by impurities. Still another advantage lies in the wide range of materials upon which the physical methods can be employed without changing its state, i.e. the method is applicable to gases, clear or cloudy liquids, solids and suspension of solids.

By my invention I am able to obtain the hydrogen density of the sample, i.e. the density of hydrogen atoms by weight per unit volume of the sample. This measurement can be obtained independent of the other components of the sample. To obtain $\rho_H$, i.e. the density of hydrogen atoms in grams per cc., it is merely necessary to determine the density $\rho$ for the unknown specimen by conventional physical means and to subtract the so determined density $\rho$ from the sum of $\rho+\rho_H$ as determined graphically from the above curve.

This application is a continuation-in-part of my co-pending application Serial Number 223,391, filed April 27, 1951, now abandoned, and entitled "Physical System for Quantitative Hydrogen Determinations."

Although I have described my invention in terms of specific examples which are set forth in considerable detail, it should be understood that these are by way of illustration only and that the invention is not limited thereto, since alternative embodiments and operating techniques will become apparent to those skilled in the art in view of my disclosure. Accordingly, modifications of my invention are contemplated without departing from the spirit of the described invention or from the scope of the appended claims.

What I claim is:

1. An apparatus for quantitatively determining the proportion of hydrogen in a hydrocarbon substance which comprises a radiation detector means for determining the gamma ray absorption coefficient of said sample, a source of gamma rays spaced from said detector means, a substance cell means interposed said source and said detector means, chamber means in fluid communication with and forming a part of said cell means, and means for determining the specific gravity of the substance in said sample cell means.

2. The method for measuring the carbon-hydrogen ratio of liquid hydrocarbons which comprises determining the specific gravity of the liquid hydrocarbons, introducing the liquid hydrocarbons into a sample cell, passing into said cell and said liquid hydrocarbons a beam of gamma rays, measuring the intensity of the unabsorbed portion of the beam on its passage through the cell and the liquid hydrocarbon sample therein, withdrawing the liquid hydrocarbons from the sample cell, redetermining the specific gravity of the liquid hydrocarbons, passing the beam of gamma rays through the empty sample cell, and measuring the intensities of the unabsorbed portion of the beam during passage through the cell in the absence of the hydrocarbon sample.

3. The apparatus for determining the proportion of hydrogen in hydrocarbon liquid sample which comprises means determining the specific gravity of the sample, means subjecting said liquid sample to hard radiation, means collecting the unabsorbed radiation leaving said sample, means initiating current flow by the presence of said collected radiation, means converting the effect of the rate of flow of said current into a proportional direct potential, and means indicating said potential in values corresponding to the proportion of hydrogen in said sample.

4. An apparatus for quantitatively analyzing a hydrocarbon liquid for hydrogen content which comprises means transmitting a beam of radiation through an unknown hydrocarbon liquid sample at a known temperature, means determining the specific gravity of a sample of such liquid at said temperature, and means for measuring the radiation absorption coefficient of the liquid at said temperature.

5. The apparatus for determining the proportion of hydrogen in a first hydrocarbon liquid which comprises means for transmitting a beam of hard radiation through said liquid over a predetermined path, second means for transmitting said beam through a second hydrocarbon liquid of known proportion of hydrogen while maintaining the length of the path the same as for said first transmission, means for determining the specific gravity of the hydrocarbon liquids, and means for measuring the intensities of said beam after being transmitted through said first hydrocarbon liquid and said second hydrocarbon liquid.

6. An apparatus for determining the percent hydrogen in a hydrocarbon liquid which comprises in combination a sample chamber, a gravity feed inlet for said chamber, an outlet means for gravity flow from said chamber, valve means on said conduit for controlling the gravity flow of liquid from said chamber, a radioactive source, a radiation detector spaced from said source, said chamber being disposed between said source and said detector, means in fluid communication with said chamber for determining the specific gravity of a liquid sample en route to said chamber, said specific gravity determination means having a liquid flow line from the bottom thereof in communication with the said inlet to said chamber whereby liquid introduced into said specific gravity means is caused to flow in series through said inlet, said chamber, said outlet and said valve means.

7. The apparatus of claim 6 wherein the energy of the radiation source is between about 0.050 m.e.v. and about 3.0 m.e.v.

8. The apparatus for determining the percentage of hydrogen in hydrogen-carbon substances including elements below iron in atomic number which comprises means for measuring the specific gravity of the sample, means for subjecting said sample to gamma radiation of an energy of between about 0.30 m.e.v. and about 2.2 m.e.v., and means for determining the gamma ray absorption co-efficient of said sample of determined specific gravity, said co-efficient and said specific gravity together being an indication of the percentage of hydrogen in the sample.

9. An apparatus for quantitatively determining the percentage of hydrogen in an unknown hydrogen-containing multi-component sample which comprises a radiation detector means for determining the source of radioactive radiation absorption co-efficient of such sample, a source of radiation having a value of between about 1.1 and about 1.5 m.e.v., a sample cell means interposed said source and said detector means, and means for determining the specific gravity of the sample.

10. The apparatus for determining the percentage of hydrogen in a hydrogen-containing substance of unknown composition which comprises means measuring the specific gravity of the sample, means subjecting said sample to gamma radiation from a source having an energy of between about 1.1 m.e.v. to about 1.5 m.e.v., and means determining the gamma ray absorption coefficient of said sample of determined specific gravity, said coefficient and said specific gravity together being an indication of the percentage of hydrogen in the sample.

11. An apparatus for determining the percent hydrogen in a hydrocarbon liquid of unknown composition without resorting to destructive chemical analyses which comprises in combination sample cell means, a measuring chamber means included in said sample cell means for determining specific gravity of a hydrocarbon liquid sample, a radioactive source adjacent said sample cell means, radiation detector means spaced from said source, said source and said detector means being disposed to embrace said sample cell means, and valve outlet conduit means from said sample cell means.

12. The apparatus of claim 4 which includes a gamma ray source to provide said beam of radiation.

13. The apparatus of claim 6 wherein said radioactive source is a source of gamma rays.

14. The apparatus of claim 9 wherein said source of radiation is a gamma ray source.

15. The apparatus of claim 11 wherein said radioactive source is a source of gamma rays having an energy of between about 0.30 m.e.v. and about 3.0 m.e.v.

16. The apparatus of claim 1 which includes a second radiation detector means, and a second sample cell means interposed said source of gamma rays and said second detector means, said second sample cell means containing a hydrocarbon liquid of known proportion of hydrogen.

References Cited in the file of this patent

UNITED STATES PATENTS

| 2,534,352 | Herzog | Dec. 19, 1950 |
| 2,641,710 | Pompeo et al. | June 9, 1953 |

FOREIGN PATENTS

| 567,280 | Great Britain | Feb. 6, 1945 |

UNITED STATES PATENT OFFICE
Certificate of Correction

Patent No. 2,883,542                                         April 21, 1959

Robert B. Jacobs

It is hereby certified that error appears in the printed specification of the above numbered patent requiring correction and that the said Letters Patent should read as corrected below.

Column 4, line 71, for "$(\rho+_{OH})$" read —$(\rho+\rho_H)$—; column 6, line 60, for "sample" read —substance—; line 61, for "substance" read —sample—.

Signed and sealed this 25th day of August 1959.

[SEAL]

Attest:
KARL H. AXLINE,
*Attesting Officer.*

ROBERT C. WATSON,
*Commissioner of Patents.*